United States Patent [19]

Fechner et al.

[11] 4,350,534
[45] Sep. 21, 1982

[54] FLUID, STABLE FORMULATIONS OF COPPER PHTHALOCYANINE OR INDANTHRONE

[75] Inventors: Wolf D. Fechner, Dirmstein; Joachim Kranz, Ludwigshafen; Rudolf Polster, Frankenthal, all of Fed. Rep. of Germany

[73] Assignee: BASF Aktiengesellschaft, Ludwigshafen, Fed. Rep. of Germany

[21] Appl. No.: 279,778

[22] Filed: Jul. 2, 1981

[30] Foreign Application Priority Data

Jul. 15, 1980 [DE]  Fed. Rep. of Germany ........ 3026697

[51] Int. Cl.³ .............................................. C09B 47/04
[52] U.S. Cl. .......................... 106/288 Q; 106/308 N; 106/308 S; 260/314.5; 260/242.2; 544/339
[58] Field of Search ........... 106/288 Q, 308 S, 308 N; 260/314.5, 242.2; 544/339

[56] References Cited

U.S. PATENT DOCUMENTS 4,069,064  1/1978  Nett et al. .................... 260/314.5 X

FOREIGN PATENT DOCUMENTS 2307022  11/1976  France .
1544869   4/1979  United Kingdom .
2009205   6/1979  United Kingdom .

*Primary Examiner*—Richard Raymond

*Attorney, Agent, or Firm*—Oblon, Fisher, Spivak, McClelland & Maier

[57] ABSTRACT

A stable fluid formulation which comprises (a) finely divided α- or β-copper phthalocyanines or finely divided indanthrone, one or more $C_6$-$C_{18}$-alkylbenzenesulfonic acids (b), a basic copper phthalocyanine (c) of the formula

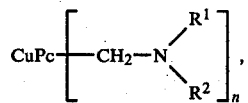

where CuPc is an n-valent copper phthalocyanine radical, $R^1$ and $R^2$ independently of one another are H or $C_1$-$C_8$-alkyl and n is 1, 2, 3 or 4, one or more compounds (d) which are obtained by Mannich condensation of 2-hydroxy-naphthalene, which may or may not contain 1 or 2 additional β-hydroxyl groups, formaldehyde and primary or secondary aliphatic, cycloaliphatic or aromatic monoamines, diamines, triamines or polyamines or 5-membered or 6-membered heterocyclic compounds which contain an >NH— group as a ring member and which contain from 1 to 6 β-hydroxynaphthyl groups, and one or more organic liquids (e). The weight ratio (b):(c):(d) is from 1:1:1 to 2.5:1.25:1.

The formulations give very deeply colored finishes with which very glossy and highly transparent coatings are obtained.

9 Claims, No Drawings

FLUID, STABLE FORMULATIONS OF COPPER PHTHALOCYANINE OR INDANTHRONE

The present invention relates to novel fluid, stable formulations of copper phthalocyanine pigments or indanthrone, and to their use.

In the preparation of printing inks and gloss paints formulations of pigments in solvents, or in binder solutions, which are compatible with printing inks and/or gloss paints are often prepared and used.

If these formulations are to have high color strength, very finely divided pigments must be used.

However, such formulations have the disadvantage that, as a rule, they are no longer pourable if the pigment content exceeds about 10% by weight.

Since, on the other hand, very concentrated formulations must be used if, in preparing the inks or paints, the choice of binder and of the required solvent is not to be restricted, the formulations employed are as a rule in the form of relatively highly concentrated pastes. For industrial use, it would be very advantageous if 20–40% strength by weight formulations of finely divided pigments in organic liquids were to have a pourable or fluid consistency.

It is an object of the present invention to provide fluid, stable, binder-free pigment formulations which contain the pigment in a stabilized form, so that on dilution no flocculation occurs.

We have found that this object is achieved and that fluid, stable formulations are obtained if these contain:

(a) finely divided copper phthalocyanine in the α- or β-modification, or finely divided indanthrone,
(b) one or more $C_6$–$C_{18}$-alkylbenzenesulfonic acids,
(c) a basic copper phthalocyanine of the formula

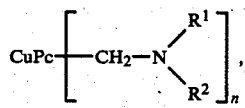

where CuPc is an n-valent radical of copper phthalocyanine, $R^1$ and $R^2$ independently of one another are hydrogen or $C_1$–$C_8$-alkyl and n is 1, 2, 3 or 4, (d) compounds which are obtained by Mannich condensation of 2-hydroxynaphthalene, which may or may not contain 1 or 2 additional β-hydroxyl groups, formaldehyde and primary or secondary aliphatic, cycloaliphatic or aromatic monoamines, diamines, triamines or polyamines or 5-membered or 6-membered heterocyclic compounds which contain an >NH group as a ring member, and which contain from 1 to 6 β-hydroxynaphthyl groups, and (d) one or more organic liquids, the weight ratio of (b):(c):(d) being from 1:1:1 to 2.5:1.25:1 and the amount of (d) being from 10 to 50% by weight, based on (a).

Using the formulations according to the invention, gloss paints having substantially improved properties compared to the prior art are obtained. These paints give very deeply colored, very glossy and highly transparent coatings. The pigments exhibit very good flow and rub-out characteristics, coupled with high color strength and high brilliance. The novel formulations are compatible with very diverse binder systems, for example oven-drying or air-drying systems, and are therefore universally useful.

The novel fluid formulations can be worked into the binder systems by simple stirring, no flocculation of the pigment being caused thereby.

Compared to the formulations disclosed in German Published Application DAS No. 2,516,054, which may be regarded as the closest prior art, the novel formulations have a much lower viscosity, and give surface coatings of improved transparency and greater color strength.

The pigment (a) in the novel formulations is finely divided copper phthalocyanine (CuPc) in the α- or β-modification, or finely divided indanthrone. The particle size of the pigments is less than 0.5 μm and preferably less than 0.1 μm.

The finely divided pigments are obtained by conventional methods, for example by dissolving the pigment in acid, eg. concentrated sulfuric acid, and pouring the solution into a large amount of water, or by milling the crude pigment in the presence or absence of salt, for example in a ball mill, or kneading it in the presence of salt, and then removing the salt with water, or by milling in the presence or absence of an inert organic solvent, or by milling in water in the presence of a base or of a dispersant.

The CuPc pigment can contain up to 1 chlorine atom per molecule.

Component (b) is a $C_8$–$C_{18}$-alkylbenzenesulfonic acid, alkyl being linear or branched. Specific examples are 4-octylbenzenesulfonic acid, 4-nonylsulfonic acid, 4-decylbenzenesulfonic acid, 4-dodecylbenzenesulfonic acid, 4-tetradecylbenzenesulfonic acid, 4-hexadecylbenzenesulfonic acid, 4-octadecylbenzenesulfonic acid and mixtures of these acids. Dodecylbenzenesulfonic acid is preferred.

Suitable basic CuPc compounds (c) are those of the formula:

where CuPc is an n-valent copper phthalocyanine radical, n is 1, 2, 3 or 4, and $R^1$ and $R^2$ independently of one another are hydrogen or $C_1$–$C_8$-alkyl.

The compounds of the formula I are known and are prepared, for example, by reacting the corresponding chloromethyl-CuPc compounds with ammonia or with the appropriate primary or secondary alkylamines. It is also possible first to prepare the corresponding compounds of the formula I, where $R^1 = R^2 = H$, and to alkylate these. Suitable alkylating agents are the corresponding alkyl halides, preferably the chlorides or bromides, the corresponding sulfuric acid esters and the corresponding esters of aromatic sulfonic acids.

Preferred components (c) are those where one or more of the radicals $R^1$ and $R^2$ are ethyl, propyl or butyl and the mean value of n is from 2.5 to 4. As a rule, (c) is a mixture of compounds of the formula I with n=2, 3 and 4.

A further essential component of the novel formulations is (d); this is obtained by Mannich condensation of 2-hydroxynaphthalene, which may or may not contain 1 or 2 additional β—OH groups, formaldehyde and a primary or secondary aliphatic, cycloaliphatic or aromatic monoamine, diamine, triamine or polyamine or a 5-membered or 6-membered heterocyclic containing an >NH group as a ring member, the condensate containing from 1 to 6 β-hydroxynaphthyl groups.

Suitable 2-hydroxynaphthalenes for the preparation of (d) are 2-hydroxynaphthalene, 2,7-dihydroxynaphthalene, 2,3-dihydroxynaphthalene and 2,3,7-trihydroxynaphthalene. Preferred condensates are those based on 2-hydroxynaphthalene and 2,7-dihydronaphthalene.

Examples of primary and secondary amines suitable for the preparation of (d) are primary and secondary, aliphatic and cycloaliphatic monoamines, $C_2$- and $C_3$-alkylenediamines, di-$C_2$- and di-$C_3$-alkylene-triamines and poly-($C_2$- and $C_3$-alkylene)-polyamines containing 3–6 alkylene groups, cycloaliphatic diamines, aromatic diamines and 5- and 6-membered saturated or unsaturated heterocyclic compounds which contain an >NH group as a ring member.

The compounds (d) are known or prepared in a known manner (Houben-Weyl, Methoden der organischen Chemie, 4th edition, Volume XI, page 731 et seq. (1957), Georg Thieme Verlag, Stuttgart.

Preferred compounds (d) are those of the general formula:

$$R^3\text{---}CH_2\text{---}X \tag{II}$$

where $R^3$ is 2-hydroxynaphth-1-yl, which may or may not contain 1 or 2 additional β-hydroxyl groups, or is

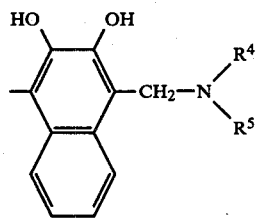

and X is a radical of the formula:

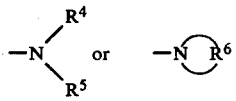

where $R^4$ and $R^5$ are identical or different and each is an aliphatic or phenylaliphatic radical, or $R^5$ is —CH$_2$—$R^3$ and $R^4$ is:

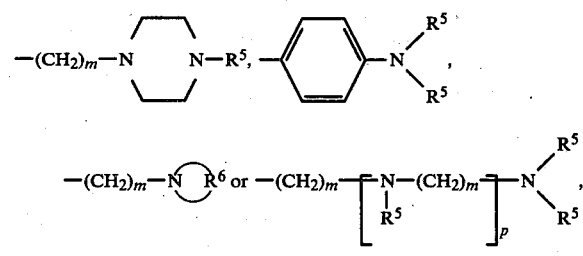

m is 2 or 3, p is 0, 1 or 2,

is a saturated or unsaturated 5-membered or 6-membered heterocyclic ring, which may or may not contain —O— or >N—$R^7$ as additional ring members and/or contain one or two >=C=O groups, and $R^7$ is $C_1$–$C_4$-alkyl.

Examples of aliphatic and phenylaliphatic radicals $R^4$ and $R^5$ are:
1. $C_1$–$C_5$-alkyl, eg. methyl, ethyl, propyl, n-butyl, isobutyl and pentyl;
2. $C_1$–$C_8$-alkoxy-$C_2$-$C_3$-alkyl, eg. 2-methoxyethyl, 3-methoxypropyl, 2-ethoxyethyl, 3-ethoxypropyl, 2-n- or i-propoxyethyl, 3-n- or i-propoxypropyl, 2-n-butoxyethyl, 3-n-butoxypropyl, 2-(2'-ethylhexoxy)-ethyl and 3-(2'-ethylhexoxy)-propyl;
3. alkoxy-alkoxy-$C_2$- and —$C_3$-alkyl, where alkoxyalkoxy is of 3 to 11 carbon atoms, eg. 2-methoxy-2-ethoxyethyl, 2'-methoxy-3-ethoxypropyl, 3'-methoxy-3-propoxypropyl, 2'-ethoxy-2-ethoxyethyl, 2'-ethoxy-3-ethoxypropyl, 3'-ethoxy-3-propoxypropyl, 2'-propoxy-2-ethoxyethyl, 2'-propoxy-3-ethoxypropyl, 3'-propoxy-3-propoxypropyl, 2'-butoxy-2-ethoxyethyl, 2'-butoxy-3-ethoxypropyl, 3'-butoxy-3-propoxypropyl and 3'-(2''-ethylhexoxy)-3-propoxypropyl;
4. hydroxy-$C_2$–$C_3$-alkyl, eg. 2-hydroxyethyl, 2-hydroxypropyl and 3-hydroxypropyl;
5. N,N-di-$C_1$-$C_4$-alkylamino-$C_2$- and -$C_3$-alkyl, eg. 2-(N,N-dimethylamino)-ethyl, 3-(N,N-dimethylamino)-propyl, 2-(N,N-diethylamino)-ethyl, 2-(N,N-dibutylamino)-ethyl, 3-(N,N-diethylamio)-propyl and 3-(N,N-dibutylamino)propyl;
6. Phenyl-$C_1$–$C_4$-alkyl, eg. benzyl, 2-phenylethyl, 2-phenylpropyl and 3-phenylpropyl; and
7. 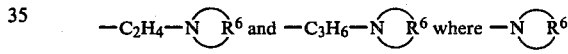

is a 5-membered or 6-membered saturated or unsaturated hetero-cyclic ring, which may or may not contain —O— or >N—$R^7$ as additional ring members and/or contain one or two >CO groups, and $R^7$ is $C_1$–$C_4$-alkyl.

Examples of heterocyclic radicals

are those derived from morpholine, piperidine, pyrrolidone, pyrrolidine, pyrazole, N'—$C_1$–$C_4$-alkylpiperazine or phthalimide.

Preferred compounds of the formula (II) are those where $R^3$ is 2,7-dihydroxynaphth-1-yl and 2-hydroxynaphth-1-yl.

Amongst these compounds of the formula (II), those where $R^3$ and $R^4$ have the meanings given above under 1 to 7 are particularly preferred. Further particularly preferred compounds of the formula II are those where $R^3$ is 2-hydroxynaphth-1-yl, or 2,7-dihydroxynaphth-1-yl and X is

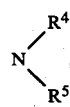

$R^5$ being —CH$_2$—$R^3$ and $R^4$ being a radical of the formula:

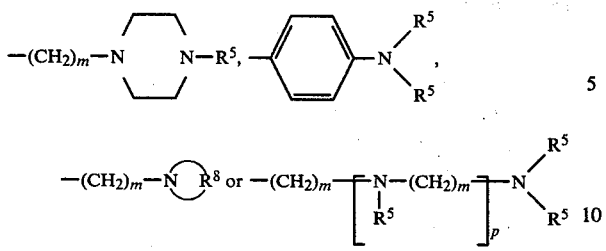

where m is 2 or 3, p is 0, 1 or 2 and

is a radical derived from morpholine or piperidine.

For cost reasons, very particularly preferred compounds (d) are those of the formulae (IIIa) and (IIIb):

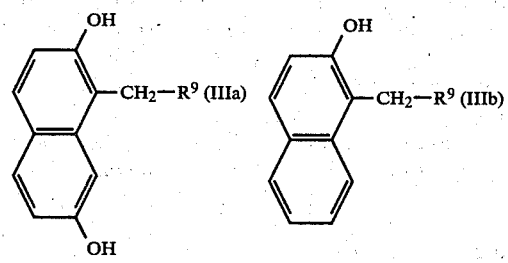

where $R^9$ is N-morpholinyl, N-piperidinyl, N-pyrrolidonyl, N-pyrazolyl, N-phthalimido, N-(N'-methylpyrazinyl) or N-(N'-ethylpyrazinyl), or is di-$C_1$-$C_4$-alkylamino, eg. dimethylamino, diethylamino, dipropylamino or dibutylamino, di-(2-methoxyethyl)-amino, di-(2-ethoxyethyl)amino, di-(2-propoxyethyl)-amino, di-(2-butoxyethyl)amino, di-(3-methoxypropyl)-amino, di-(3-ethoxypropyl)amino, di-(3-butoxypropyl)-amino, di-(2-hydroxyethylamino) or dibenzylamino.

Suitable organic liquids (e) to use in the fluid formulations are those conventionally employed in the production of gloss paints, for example $C_1$-$C_{18}$-alkylbenzenes, eg. toluene, xylenes and $C_9$-$C_{11}$-alkylbenzenes, esters of ethylene glycol mono-$C_1$-$C_4$-alkyl ethers with $C_2$-$C_4$-alkanoic acids, eg. ethylene glycol monoethyl ether acetate, and mixtures of these liquids.

The formulations according to the present invention contain from 10 to 50% by weight of (d), based on (a), the weight ratio of (b):(c):(d) being from 1:1:1 to 2.5:1.25:1.

The novel fluid formulations as a rule contain from 20 to 45% by weight of (a), from 2 to 20% by weight of (b), from 2 to 12.5% by weight of (c), from 2 to 10% by weight of (d) and from 37.5 to 74% by weight of (e), based on the formulation of (a+b+c+d+e).

Preferred formulations contain from 22 to 28% by weight of (a), from 4 to 16% by weight of (b), from 4 to 8% by weight of (c), from 4 to 8% by weight of (d) and from 40 to 66% by weight of (e), based on (a+b+c+d+e).

The novel formulations are obtained by mixing the components in the desired organic liquid or liquids. Advantageously, the finely divided pigment (a) is introduced into the mixture of (b)+(c)+(d) in (e), since this directly gives a liquid formulation. It is also possible first to introduce (a) into (e), which gives a viscous to firm paste, which becomes fluid on incorporation of (b)+(c)+(d).

The Examples which follow illustrate the invention. Parts and percentages are by weight. The viscosities of the formulations are stated in terms of the flow time of the formulation, in seconds, measured in a DIN cup with 6 mm nozzle.

A. Tinctorial tests on the formulations

A1. Finish

To access the tinctorial properties of the pigments contained in the formulations, finishes based on 2 different systems were prepared with the formulations. Finish 1: Baking finish based on alkyl-urea-melamine resin (solvent: xylene/butanol mixture). Finish 2: Long-oil air-drying alkyd resin ($^R$Alkydal F 681) (solvent: mineral spirit).

The finishes used to produce the colored surface coatings were prepared as follows:

1.1 Colored finishes (1) and (2) (pigment content: 10%) were prepared from the formulations by 2-stage dilution with a clear finish. For this, the amount of pigment formulation corresponding to 10 g of pigment was adjusted, where necessary, to 20% pigment content, and was diluted, in 2 stages, with the amounts of finish 1 finish 2 shown in the Table below, these finishes having the binder concentration also shown in the Table.

| Dilution stage | Pigment formulation* | Finish 1 | | Finish 2 | |
|---|---|---|---|---|---|
| | | Binder g | % | Binder g | % |
| I | 50 | 25 | 21.5 | 25 | 25 |
| II | | 25 | 43 | 25 | 50 |

*20% pigment content

In stage I, the finish was slowly stirred in for 2 minutes, using a blade stirrer. In stage II, the mixture was stirred for 3 minutes at 2,000 rpm.

1.2 Full-shade finishes (1) and (2) (5% pigment). 25 g of colored finish (1) or (2) from A 1.1 are homogeneously mixed with 25 g of finish 1 or finish 2, containing 35% of binder.

1.3 White reduction—finish 1. 4 g of full-shade finish 1 from A 1.2 are mixed homogeneously with 20 g of white finish (containing 40% of titanium dioxide).

1.4 White reduction—finish 2. 2 g of full-shade finish 2 (from A 1.2) are mixed homogeneously with 20 g of white finish (containing 20% of titanium dioxide) and 18 drops of hardener.

1.5 Comparative full-shade finishes 1 and 2 (5% pigment). 5 g of comparative pigment and 95 g of finish 1 or finish 2 (binder content: 35%) are shaken with 100 ml of glass beads (3 mm φ) for 60 minutes on a shaking mill (® RED DEVIL).

The glass beads are then sieved out from the finish.

1.6 White reduction—finish 1 (comparison). 4 g of full-shade finish 1 from A 1.5 are mixed homogeneously with 20 g of white finish (containing 40% of titanium dioxide).

1.7 White reduction—finish 2 (comparison). 2 g of full-shade finish 2 from A 1.5 are mixed homogeneously with 20 g of white finish (containing 20% of titanium dioxide) and 18 drops of hardener.

A2. Colored coatings, and their evaluation 2.1 Finish 1—full-shade coating. A 150 μm coating of full-shade finish 1 from A 1.2 or A 1.5 is spread on contrast board with a spiral doctor.

The coating is air-dried for 20 minutes and then baked at 120° C. for 15 minutes.

2.2 Finish 2—Full-shade coating. 10 g of full-shade finish 2 from A 1.2 or A 1.5 are homogeneously mixed with 0.2 g of hardener. A 150 μm coating is spread on contrast tinplate by means of a spiral doctor and is air-dried.

2.3 White reduction—finish 1. A 150 μm coating of the finish from A 1.3 or A 1.6 is spread on board by means of a spiral doctor and is air-dried for 20 minutes and then baked at 120° C. for 15 minutes.

2.4 White reduction—finish 2. A 150 μm coating of the finish from A 1.4 or A 1.7 is spread on board by means of a spiral doctor and is air-dried.

2.5 The full-shade coatings combined according to A 2.1 and A 2.2 are assessed visually, in respect of gloss, brightness and transparency, in comparison to corresponding colored coatings employing comparative pigments of the prior art.

2.6 The white reduction coatings obtained according to A 2.3 and A 2.4 are evaluated by the CIELAB system (Dr. Fritz Heinrich, defazet, 1977, No. 8, 318–324), in respect of color strength, hue ($\Delta H$) and purity ($\Delta C$). The color strength is expressed as a color equivalent (CD), taking the coloration containing the comparative pigment as 100.

EXAMPLE 1

20 parts of finely divided CuPc in the β-modification (primary particle size 0.1 μm) are introduced into 60 parts of a 70:30 mixture of $C_9$–$C_{19}$-alkylbenzenes and ethylene glycol ethyl ether acetate, 5 parts of

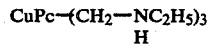

and 5 parts of the compound:

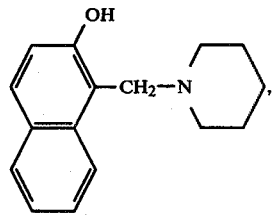

and the mixture is stirred until homogeneous. 10 parts of dodecylbenzenesulfonic acid are then added, with stirring. A fluid formulation (cup flow time 11 s) is obtained, which in a baking finish and in an alkyd finish gives very deeply colored brilliant white reductions having a pure hue, and very transparent full-shade colorations. The formulation is evaluated tinctorially as described in A 1 and A 2. The results are shown in Table I.

EXAMPLE 2

20 parts of finely divided β-CuPc (primary particle size <0.1 μm) are stirred into a mixture of 60 parts of the solvent mixture (e) mentioned in Example 1, 1.0 part of dodecylbenzenesulfonic acid (b), 5 parts of CuP-c—(CH$_2$NHC$_2$H$_5$)$_{3.5}$ (c) and 5 parts of the compound of the formula:

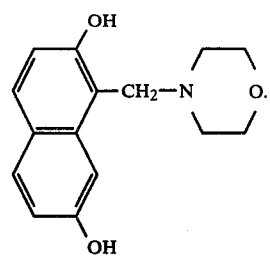

The formulation obtained has a cup flow time of 5 s. The tinctorial evaluation is carried out on colored coatings obtained as described in A 1 and A 2. The results are summarized in Table I.

EXAMPLE 3

30 parts of finely divided β-CuPc (primary particle size <0.1 μm) are introduced, with stirring, into the mixture of (b), (c) and (d) in (e), described in Example 2. A fluid formulation (DIN cup flow time 14 s) is obtained.

The results of evaluating the colored coatings obtained according to A 1 and A 2 are shown in Table I.

EXAMPLE 4

40 parts of finely divided β-CuPc (primary particle size <0.1 μm) are introduced, with stirring, into the mixture of (b), (c) and (d) in (e), described in Example 2. The formulation obtained is still fluid and pourable. The results of the tinctorial evaluation of the colorations obtained according to A 1 and A 2 are shown in Table I.

EXAMPLE 5

20 parts of finely divided β-CuPc (primary particle size <0.1 μm) are stirred into a mixture of 5 parts of the compound of the formula:

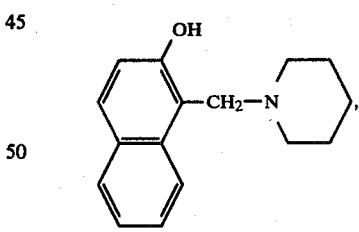

and 5 parts of

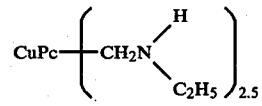

in 60 parts of a 70:30 mixture of mineral spirit and ethylene glycol ethyl ether acetate. After addition of 10 parts of dodecylbenzenesulfonic acid, a fluid pigment formulation is obtained, having a DIN cup flow time of 14 s.

The results of evaluating the colorations are shown in Table I.

EXAMPLES 6 TO 22

The procedure followed is similar to that described in Examples 1, 2, 3 or 5, but using the agents (d) shown in column 2 of Table I. Fluid formulations are obtained. The DIN cup (6 mm nozzle) flow times of the formulations, and the results of evaluating the colorations obtained with the formulations, are shown in Table I.

COMPARATIVE EXAMPLE I

For comparison, full-shade finishes and white reductions in the finishes 1 and 2 are prepared as described in A 1.5 to A 1.6, using the same pigment as in Examples 1 to 29, and the colorations are evaluated as described in A 2.

The results are shown in Tables I and II.

COMPARATIVE EXAMPLE II

The formulation is prepared as described in Example 2, but without component (d).

The formulation is thick and thixotropic. The results of evaluating the colorations obtained with this formulation are shown in Tables I and II.

TABLE I

| Example | Agent (d) | Formulation cup flow time [sec] | Finish 1 White reduction CE | ΔH | ΔC | Full shade Transparency | Finish 2 White reduction CE | ΔH | ΔC | Full shade Transparency |
|---|---|---|---|---|---|---|---|---|---|---|
| 1 | (1-piperidinylmethyl-2-naphthol) | 11 | 78 | +0.2 | +1.6 | +5 | 58 | +1.2 | +3.6 | +2 |
| 2 | (1-morpholinomethyl-2,7-dihydroxynaphthalene) | 5 | 74 | −1.3 | ±0 | +6 | 78 | +0.7 | ±0 | +5 |
| 3 | " | 14 | 74 | −0.7 | +0.3 | +6 | 73 | +1.1 | +0.6 | +4 |
| 4 | " | still fluid | 78 | −0.5 | +0.4 | +4 | 79 | +1.3 | +0.4 | +4 |
| 5 | (1-morpholinomethyl-2-naphthol) | 14 | 76 | +0.5 | +1.3 | +3 | 78 | +2.9 | +0.9 | +4 |
| 6 | (1-(2-oxopyrrolidinyl)methyl-2-naphthol) | 6 | 80 | +0.2 | +1.5 | +5 | 80 | +2.3 | +1.2 | +2 |
| 7 | (1-imidazolylmethyl-2-naphthol) | 8 | 81 | +0.4 | +1.4 | +5 | 65 | +1.9 | +3.0 | +2 |
| 8 | (1-phthalimidomethyl-methyl-2-naphthol) | 8 | 85 | ±0 | +1.8 | +5 | 77 | +2.2 | +1.4 | +2 |
| 9 | (1-piperidinylmethyl-2,7-dihydroxynaphthalene) | 5 | 74 | −0.1 | +1.4 | +5 | 58 | +1.4 | +3.2 | +2 |

TABLE I-continued

| Example | Agent (d) | Formulation cup flow time [sec] | Finish 1 | | | | Finish 2 | | | |
|---|---|---|---|---|---|---|---|---|---|---|
| | | | White reduction | | | Full shade Transparency | White reduction | | | Full shade Transparency |
| Comp. Ex. II | 0 | thick thixotropic | 88 | +0 | +0.2 | +2 | 95 | +0.9 | −0.5 | +3 |
| | | | | H | C | | | H | C | |
| Comp. Ex. I | according to and A 1.7 | — | 100 | 235.8 | 39.7 | 0 | 100 | 230.9 | 37.7 | 0 |
| 10 | OH-naphthalene-CH₂—N(piperazine)N—CH₃ with OH | 7 | 83 | +0.3 | +1.0 | +5 | 95 | +2.9 | ±0 | +4 |
| 11 | OH-naphthalene—CH₂—N(CH₃)₂ | 6 | 84 | +0.4 | +1.2 | +5 | 64 | +1.5 | +3.1 | +3 |
| 12 | OH-naphthalene—CH₂—N(C₂H₄—OCH₃)₂ | 6 | 79 | +0.4 | +1.6 | +5 | 58 | +1.4 | +3.7 | +2 |
| Comp. Ex. II | 0 | thick thixotropic | 88 | +0 | +0.2 | +2 | 95 | +0.9 | −0.5 | +3 |
| Comp. Ex. I | according to A 1.5, A 1.6 and A 1.7 | — | 100 | 235.8 | 39.7 | 0 | 100 | 230.9 | 37.7 | 0 |

| Example | Agent (d) $\left[\text{OH-naphthalene-CH}_2\right]_2$ | Formulation cup flow time [sec] | Finish 1 | | | | Finish 2 | | | |
|---|---|---|---|---|---|---|---|---|---|---|
| | | | White reduction | | | Full shade Transparency | White reduction | | | Full shade Transparency |
| | | | CE | ΔH | ΔC | | CE | ΔH | ΔC | |
| 13 | >N—(CH₂)₃—N(CH₃)₂ | 6 | 84 | +0.2 | +1.1 | +6 | 83 | +2.6 | +1.1 | +3 |
| 14 | >N—(CH₂)₃—O—CH₂—CH₂—OC₄H₉ | 6 | 78 | +0.2 | +1.4 | +5 | 74 | +1.9 | +2.0 | +2 |
| 15 | >N—CH₂—CH₂—OH | 8 | 83 | −0.2 | +1.1 | +5 | 85 | +2.3 | +0.9 | +2 |
| 16 | >N—CH₂—C₆H₅ | 7 | 78 | +0.5 | +1.6 | +5 | 69 | +1.5 | +3.3 | +3 |
| 17 | >N—(CH₂)₃—N(morpholine)O | 5 | 92 | +0.6 | +0.9 | +6 | 65 | +1.5 | +2.8 | +3 |
| 18 | >N—(CH₂)₃—N(piperazine)N—CH₂-naphthalene-OH | 5 | 79 | +0.4 | +1.6 | +6 | 65 | +1.7 | +2.7 | +3 |

TABLE I-continued

| Example | Agent (d) | Formulation cup flow time [sec] | Finish 1 White reduction CE | ΔH | ΔC | Full shade Transparency | Finish 2 White reduction CE | ΔH | ΔC | Full shade Transparency |
|---|---|---|---|---|---|---|---|---|---|---|
| 19 | (bis-hydroxynaphthylmethyl amine structure) | 23 | 88 | +0.4 | +1 | +6 | 86 | +2.2 | +0.8 | +2 |
| 20 | (bis-hydroxynaphthylmethyl tolyl amine structure) | 8 | 76 | −1.1 | +0.3 | +6 | 67 | −1.6 | +0.6 | +2 |
| 21 | (bis-naphthyl diamine structure) | 5 | 80 | +0.3 | 1.2 | +5 | 76 | +2.5 | +1.2 | +3 |
| 22 | (dimorpholinomethyl dihydroxynaphthalene) | 8 | 100 | −0.4 | −0.9 | +5 | 102 | +1.2 | +1.1 | +6 |

EXAMPLES 23 TO 29

The formulations are obtained by introducing finely divided CuPc (β-modification, primary particle size ≦0.1 μm) (a) into a previously prepared mixture of (b), (c) and (d) in (e) (=70:30 mixture of $C_9$–$C_{19}$-alkylbenzenes and ethylene glycol ethyl ether acetate).

4-Dodecylbenzenesulfonic acid is used as (b), as (c) and 1-morpholinomethylene-2-hydroxynaphthalene as (d).

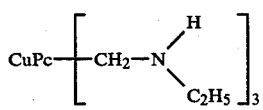

The amounts of (a), (b), (c), (d) and (e) are shown in columns 2 to 6 of Table II. The cup flow times of the formulations obtained are shown in column 7 of Table II. The results of the tinctorial assessment of the colorations obtained with the formulations based on finishes 1 and 2 (cf. A1 and A2) are shown in columns 8 to 15 of Table II.

TABLE II

| Example | Formulation Amount of (a) [g] | (b) [g] | (c) [g] | (d) [g] | (e) [g] | Cup flow time [s] | Tinctorial assessment Finish 1 White reduction CE | ΔH | ΔC | Full shade transparency | Finish 2 White reduction CE | ΔH | ΔC | Full shade transparency |
|---|---|---|---|---|---|---|---|---|---|---|---|---|---|---|
| 23 | 20 | 2 | 2 | 2 | 74 | 20 | 93 | +0.8 | −0.2 | +5 | 72 | +1.9 | +1.5 | +4 |
| 24 | 20 | 10 | 10 | 10 | 50 | 26 | 82 | −0.7 | −0.1 | +6 | 55 | −0.8 | +3.3 | +6 |
| 25 | 20 | 10 | 5 | 10 | 55 | 14 | 77 | −0.1 | +0.4 | +5 | 64 | +0.4 | +0.2 | +5 |

TABLE II-continued

| | Formulation Amount of | | | | | Cup flow time [s] | Tinctorial assessment | | | | | | |
|---|---|---|---|---|---|---|---|---|---|---|---|---|---|
| | | | | | | | Finish 1 | | | | Finish 2 | | |
| | (a) [g] | (b) [g] | (c) [g] | (d) [g] | (e) [g] | | White reduction | | | Full shade trans-parency | White reduction | | Full shade trans-parency |
| Example | | | | | | | | | | | | | |
| 26 | 20 | 4 | 2 | 2 | 72 | 9 | 78 | −0.6 | +0.1 | +4 | 90 | +2 −0.7 | +5 |
| 27 | 20 | 20 | 10 | 40 | 167 | | 79 | −2.4 | −0.5 | +6 | 79 | −0.8 −0.1 | +6 |
| 28 | 20 | 5 | 5 | 10 | 60 | 8 | 114 | −0.1 | −0.3 | +5 | 58 | ±0 +2.7 | +6 |
| 29 | 25 | 8 | 4 | 3.5 | 59.5 | 14 | 76 | +0.5 | +1.3 | +3 | 78 | +2.9 +0.9 | +4 |
| Comp. Ex II | 20 | 10 | 5 | 0 | 65 | thick thixo-tropic | 88 | ±0 | +0.2 | +2 | 95 | +0.9 −0.5 | +3 |
| Comp. Ex I | (according to A 1.5, A 1.6 and A 1.7) | | | | | — | 100 | H 235.8 | C 39.7 | 0 | 100 | H 230.9 C 37.7 | 0 (comparison) |

EXAMPLES 30 AND 31

The formulations are prepared as described in Example 23, except that (a) is a finely divided CuPc pigment in the α-modification (primary particle size ≦0.5 μm, surface area 60 m²/g, measured by the BET N₂ absorption method).

The amounts of (a), (b), (c), (d) and (e) are shown in Table III (columns 2 to 6). The cup flow time of the formulation is shown in column 7 and the tinctorial results on colorations obtained with the formulation are shown in columns 8 to 15.

COMPARISON EXAMPLE III

For comparison, full-shade colorations and white reductions were prepared, as described in A 1.5 to A 1.7, with finishes 1 and 2 and the pigment used in Example 30, and colored coatings were produced and evaluated as described in A2. The tinctorial results are shown in Table III.

EXAMPLES 32 AND 33

The formulations are prepared as described in Example 23, but instead of the CuPc pigment, a finely divided indanthrone pigment (α-modification, primary particle size <0.1 μm) is used. The cup flow times of the formulations are shown in Table III. The tinctorial results are shown in columns 8 to 15 of the same Table.

COMPARATIVE EXAMPLE IV

Full shade paints and white reductions were prepared, as described in A 1.5 to A 1.7, from the indanthrone pigment used in Examples 32 and 33, and finishes 1 and 2. The colored coatings were prepared, and evaluated, as described in A2. The results of the tinctorial evaluation are shown in Table III, columns 8 to 15.

TABLE III

| | Formulation Amount of | | | | | Cup flow time [s] | Tinctorial assessment | | | | | | |
|---|---|---|---|---|---|---|---|---|---|---|---|---|---|
| | | | | | | | Finish 1 | | | Full shade trans-parency | Finish 2 | | Full shade trans-parency |
| Example | (a) [g] | (b) [g] | (c) [g] | (d) [g] | (e) [g] | | White reduction | | | | White reduction | | |
| | | | | | | | CE | ΔH | ΔC | | CE | ΔH ΔC | |
| 30 | 20 | 10 | 5 | 5 | 60 | 5 | 66 | −1.3 | +0.6 | +4 | 50 | −1.1 +3 | +5 |
| 31 | 25 | 8 | 4 | 3.5 | 59.5 | 13 | 73 | +0.8 | +1.2 | +4 | 50 | −0.1 +3.9 | +4 |
| Comp. Ex. III | | | | | | — | 100 | H 243.8 | C 38.9 | 0 | 100 | H 238.11 C 33.8 | 0 (comparison) |
| | | | | | | | | ΔH | ΔC | | | ΔH ΔC | |
| 32 | 20 | 10 | 5 | 5 | 60 | 6 | 47 | −3.0 | +2.9 | +6 | 47 | −2.6 +3.4 | +5 |
| 33 | 25 | 8 | 4 | 3.5 | 59.5 | 28 | 56 | −3.0 | +2.5 | +6 | 56 | −1.9 +3.9 | +5 |
| Comp. Ex. IV | | | | | | | 100 | H 262.8 | C 30.1 | 0 | 100 | H 260.5 C 27.1 | 0 (comparison) |

We claim:
1. A fluid, stable formulation which contains
   (a) finely divided copper phthalocyanine in the α- or β-modification, or finely divided indanthrone,
   (b) one or more $C_6$–$C_{18}$-alkylbenzenesulfonic acids,
   (c) a basic copper phthalocyanine of the formula:

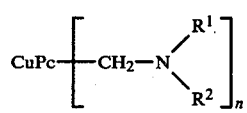

$$CuPc \left[ -CH_2-N \begin{matrix} R^1 \\ R^2 \end{matrix} \right]_n$$

where CuPc is an n-valent radical of copper phthalocyanine, $R^1$ and $R^2$ independently of one another are hydrogen or $C_1$–$C_8$-alkyl and n is 1, 2, 3 or 4,
   (d) one or more compounds which are obtained by Mannich condensation of 2-hydroxynaphthalene, which may or may not contain 1 or 2 additional β-hydroxyl groups, formaldehyde and primary or secondary aliphatic, cycloaliphatic or aromatic monoamines, diamines, triamines or polyamines or 5-membered or 6-membered heterocyclic compounds which contain an >NH group as a ring member, and which contain from 1 to 6 β-hydroxynaphthyl groups, and (e) one or more organic liquids, the weight ratio of (b):(c):(d) being from 1:1:1 to 2.5:1.25:1 and the amount of (d) being from 10 to 50% by weight, based on (a).

2. A formulation as claimed in claim 1, wherein component (d) consists of one or more compounds of the general formula:

R³—CH₂—X where R³ is 2-hydroxynaphth-1-yl, which may or may not contain 1 or 2 additional β-hydroxyl groups, or is

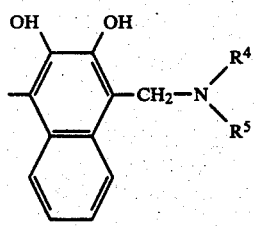

and X is a radical of the formula:

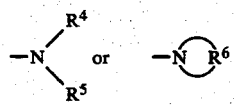

where R⁴ and R⁵ are identical or different and each is an aliphatic or phenylaliphatic radical, or R⁵ is —CH₂—R³ and R⁴ is:

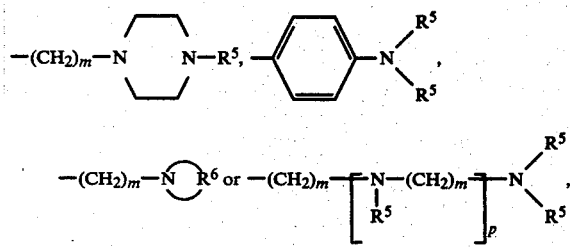

m is 2 or 3, p is 0, 1 or 2,

is a saturated or unsaturated 5-membered or 6-membered heterocyclic ring, which may or may not contain —O— or >N—R⁷ as additional ring members and/or contain one or two >C=O groups, and R⁷ is C₁-C₄-alkyl.

3. A formulation as claimed in claim 2, wherein component (d) consists of one or more compounds of the formula:

R³—CH₂—X where R³ is 2-hydroxynaphthyl or 2,7-dihydroxynaphthyl and X is

R⁵ being —CH₂—R³ and R⁴ being

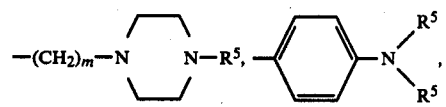

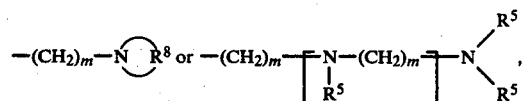

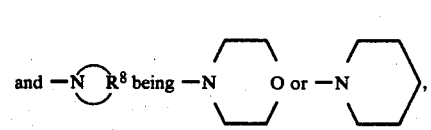

m is 2 or 3 and p is 0, 1 or 2.

4. A formulation as claimed in claim 1, wherein component (d) consists of one or more compounds of the formula:

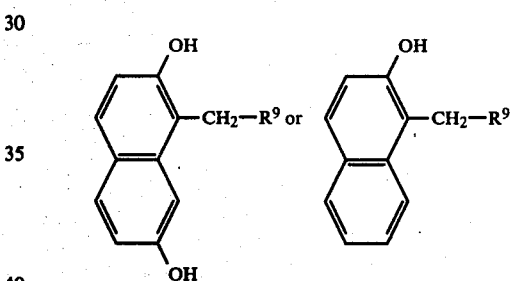

where R⁹ is N-morpholinyl, N-piperidinyl, N-pyrrolidonyl, N-pyrazolyl, N-phthalimido, N-(N'-methylpyrazinyl), N-(N'-ethylpyrazinyl), dimethylamino, diethylamino, dipropylamino, dibutylamino, di-(2-methoxyethyl)-amino, di-(2-ethoxyethyl)-amino, di-(2-propoxyethyl)-amino, di-(2-butoxyethyl)-amino, di-(3-methoxypropyl)-amino, di-(3-ethoxypropyl)-amino, di-(3-butoxypropyl)-amino, di-(2-hydroxyethylamino) or dibenzylamino.

5. A formulation as claimed in claim 1 or 2 or 4, which contains from 20 to 45% by weight of (a), from 2 to 20% by weight of (b), from 2 to 12.5% by weight of (c), from 2 to 10% by weight of (d) and from 37.5 to 74% by weight of (e), in each case based on (a+b+c+d+e).

6. A fluid, stable formulation, which contains
(a) finely divided copper phthalocyanine in the α- or β-modification, or finely divided indanthrone,
(b) dodecylbenzenesulfonic acids,
(c) a basic copper phthalocyanine of the formula:

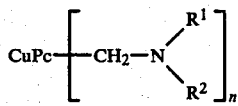

where CuPc is an n-valent radical of copper phthalocyanine, $R^1$ and $R^2$ independently of one another are hydrogen or $C_1$–$C_8$-alkyl and n is 1, 2, 3 or 4, (d) one or more compounds of the formula:

where $R^3$ is 2-hydroxynaphth-1-yl or 2,7-dihydroxynaphth-1-yl and X is

$R^5$ being —$CH_2$—$R^3$ and $R^4$ being

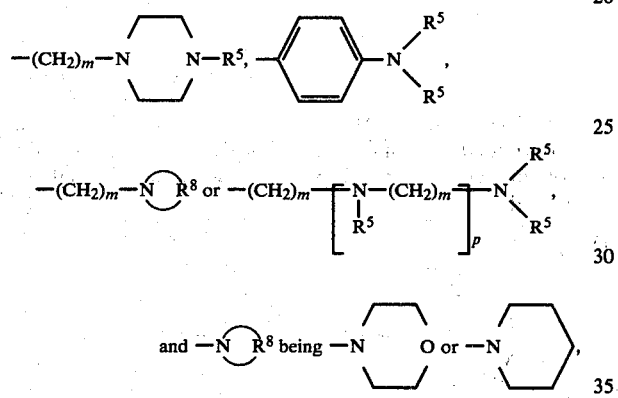

m is 2 or 3 and p is 0, 1 or 2, and (e) one or more organic liquids, the weight ratio of (b):(c):(d) being from 1:1:1 to 2.5:1.25:1 and the amoount of (d) being from 10 to 50% by weight, based on (a).

7. A fluid, stable formulation, which contains:

(a) finely divided copper phthalocyanine in the α- or β-modification, or finely divided indanthrone, (b) dodecylbenzenesulfonic acids, (c) a basic copper phthalocyanine of the formula:

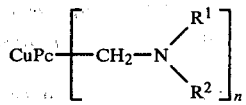

where CuPc is an n-valent radical of copper phthalocyanine, $R^1$ and $R^2$ independently of one another are hydrogen or $C_1$–$C_8$-alkyl and n is 1, 2, 3 or 4, (d) one or more compounds of the formula:

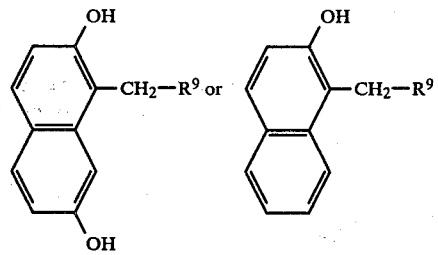

where $R^9$ is N-morpholinyl, N-piperidinyl, N-pyrrolidonyl, N-pyrazolyl, N-phthalimido, N-(N'-methylpyrazinyl), N-(N'-ethylpyraziny), dimethylamino, diethylamino, dipropylamino, dibutylamino, di-(2-methoxyethyl)-amino, di-(2-ethoxyethyl)-amino, di-(2-propoxyethyl)-amino, di-(2-butoxyethyl)-amino, di-(3-methoxypropyl)-amino, di-(3-ethoxypropyl)-amino, di-(3-butoxypropyl)-amino, di-(2-hydroxyethylamino) or dibenzylamino, and (e) one or more organic liquids, the weight ratio of (b):(c):(d) being from 1:1:1 to 2.5:1.25:1 and the amount of (d) being from 10 to 50% by weight, based on (a).

8. A formulation as claimed in claim 6 or 7, which contains from 20 to 45% by weight of (a), from 2 to 20% by weight of (b), from 2 to 12.5% by weight of (c), from 2 to 10% by weight of (d) and from 37.5 to 74% by weight of (e), in each case based on (a+b+c+d+e).

9. A formulation as claimed in claim 6 or 7, which contains from 22 to 28% by weight of (a), from 4 to 16% by weight of (b), from 4 to 8% by weight of (c), from 4 to 8% by weight of (d) and from 40 to 66% by weight of (e), in each case based on (a+b+c+d+e).

* * * * *